(12) United States Patent
Jiang

(10) Patent No.: US 12,227,116 B2
(45) Date of Patent: Feb. 18, 2025

(54) CAR FLOOR MAT

(71) Applicant: Shandong Huafeng Auto Parts Co., Ltd., Linyi (CN)

(72) Inventor: Dianzhang Jiang, Linyi (CN)

(73) Assignee: Shandong Huafeng Auto Parts Co., Ltd, Linyi (CN)

( * ) Notice: Subject to any disclaimer, the term of this patent is extended or adjusted under 35 U.S.C. 154(b) by 0 days.

(21) Appl. No.: 18/412,123

(22) Filed: Jan. 12, 2024

(65) Prior Publication Data

US 2024/0190323 A1 Jun. 13, 2024

(51) Int. Cl.
| | |
|---|---|
| *B60N 3/04* | (2006.01) |
| *B32B 5/02* | (2006.01) |
| *B32B 5/18* | (2006.01) |
| *B32B 25/08* | (2006.01) |
| *B32B 25/16* | (2006.01) |
| *B32B 27/06* | (2006.01) |
| *B32B 27/08* | (2006.01) |
| *B32B 27/12* | (2006.01) |

(Continued)

(52) U.S. Cl.
CPC ............ *B60N 3/04* (2013.01); *B32B 5/024* (2013.01); *B32B 5/18* (2013.01); *B32B 25/08* (2013.01); *B32B 25/16* (2013.01); *B32B 27/065* (2013.01); *B32B 27/08* (2013.01); *B32B 27/12* (2013.01); *B32B 27/32* (2013.01); *B32B 27/36* (2013.01); *B32B 2250/05* (2013.01); *B32B 2266/025* (2013.01); *B32B 2270/00* (2013.01); *B32B 2274/00* (2013.01); *B32B 2307/554* (2013.01); *B32B 2307/7376* (2023.05); *B32B 2307/744* (2013.01); *B32B 2471/04* (2013.01); *B32B 2605/003* (2013.01)

(58) Field of Classification Search
CPC ........... B32B 5/18; B32B 25/08; B32B 25/16; B32B 27/065; B32B 27/08; B32B 27/12; B32B 27/32; B32B 27/36; B32B 2250/05; B32B 2274/00; B32B 2307/554; B32B 2307/7376; B32B 2307/744; B32B 2471/04; B60N 3/048
See application file for complete search history.

(56) References Cited

U.S. PATENT DOCUMENTS

| | | |
|---|---|---|
| 2004/0067340 A1 | 4/2004 | Chiang |
| 2006/0088689 A1 | 4/2006 | Lemire et al. |

(Continued)

FOREIGN PATENT DOCUMENTS

| | | | | |
|---|---|---|---|---|
| CN | 202827239 U | * | 3/2013 | |
| EP | 1308120 A3 | * | 4/2004 | ............ A47L 13/29 |

(Continued)

OTHER PUBLICATIONS ip.com translation of JP-2013199268-A (Year: 2024).*
ip.com translation of CN-202827239-U (Year: 2024).*

*Primary Examiner* — Michael Zhang

(57) ABSTRACT

The present disclosure provides a car floor mat. The car floor mat includes a wear-resistant layer arranged on an upper surface, an anti-skid layer arranged on a lower surface, a supporting layer and a stable layer stacked between the wear-resistant layer and the anti-skid layer. The wear-resistant layer, the anti-skid layer, the supporting layer and the stable layer are all layer structures having equal thickness, and the adjacent layers are connected by a heat sealing process.

7 Claims, 2 Drawing Sheets

(51) Int. Cl.
*B32B 27/32* (2006.01)
*B32B 27/36* (2006.01)

(56) References Cited

U.S. PATENT DOCUMENTS

2007/0110950 A1* 5/2007 Yang ................. B32B 27/32
428/95
2012/0319426 A1* 12/2012 Macneil ............... B29C 51/10
296/75
2018/0208109 A1 7/2018 Ying

FOREIGN PATENT DOCUMENTS

JP 2013199268 A * 10/2013 ............. B32B 27/12
KR 477822 Y1 * 7/2015 ......... A47G 27/0212

* cited by examiner

CAR FLOOR MAT

TECHNICAL FIELD

The present disclosure relates to the field of car components, more specifically, in particular to a car floor mat.

BACKGROUND

With the development of science and technology and the improvement of living standards, cars increasingly get into people's lives. The car is used as transportation means to achieve the function of transportation, and the requirements on the using experience of vehicles become higher and higher. As a necessity of vehicles, the car floor mat needs to meet both use requirements and safety requirements, such as wear resistance, dirt resistance, skid resistance, water resistance, high temperature resistance, softness, sound insulation and so on.

At present, the traditional car floor mat generally adopts injection molding production process, and the car floor mat prepared by injection molding process made of a single-layer material has at least the following problems: uneven thickness of the floor mat, edge warping due to low high-temperature resistance and so on.

SUMMARY

In order to have a basic understanding of some aspects of the disclosed embodiments, a brief summary is given below. The summary is not intended to be a general comment or to identify key/important constituent elements or to describe the scope of protection of these embodiments, but rather to serve as a preface to the following detailed description.

The present disclosure provides a car floor mat to solve the problem of floor mat deformation caused by a single-layer structure or uneven thickness of the car floor mat. The car floor mat simultaneously meets the comprehensive performance requirements of wear resistance, scratch resistance, softness, stable structure, skid resistance and water resistance. Moreover, the car floor mat and components of the car floor mat are simple in structures, and are suitable for being applied in large-scale industrial production.

Therefore, in the first aspect, the embodiment of the present disclosure provides a car floor mat, including:
- a wear-resistant layer arranged on an upper surface of the car floor mat;
- an anti-skid layer arranged on a lower surface of the car floor mat;
- a supporting layer and a stable layer, wherein the supporting layer and the stable layer are stacked between the wear-resistant layer and the anti-skid layer;
- the wear-resistant layer, the anti-skid layer, the supporting layer and the stable layer are all layer structures having equal thickness, and the adjacent layers are connected by a heat sealing process.

Preferably, the supporting layer is adjacent to the wear-resistant layer, and the stable layer is adjacent to the anti-skid layer.

Preferably, the car floor mat also includes a connecting layer. The connecting layer is arranged between the stable layer and the anti-skid layer. The connecting layer, the stable layer and the anti-skid layer have equal thickness. The connecting layer is respectively connected with the stable layer and the anti-skid layer by heat sealing processes.

Preferably, the stable layer includes a chemically cross-linked polyethylene foam material (XPE), the anti-skid layer includes polyethylene terephthalate (PET), and the connecting layer includes polyethylene (PE).

Preferably, the wear-resistant layer includes a mixture of thermoplastic vulcanizate (TPV) and a thermoplastic elastomer (TPE), and the supporting layer includes TPE.

Preferably, the wear-resistant layer includes TPV and TPE; and/or, the anti-skid layer includes PET; and/or, the supporting layer includes TPE; and/or, the stable layer includes XPE.

Preferably, the car floor mat also includes a mesh fabric arranged on a lower surface of the anti-skid layer.

Preferably, an upper surface of the wear-resistant layer is provided with anti-skid strips.

The anti-deformation car floor mat provided by the embodiment of the present disclosure can achieve the following technical effects.

The multi-layer combined car floor mat is formed by, the supporting layer, the stable layer and the anti-skid layer that are connected by heat sealing processes. Different layer structures play different roles. The wear-resistant layer is arranged on a top layer, so that the wear resistance of the floor mat can be increased. The supporting layer and the stable layer can play a role in supporting the floor mat, so that the floor mat is prevented from deforming. Then, the anti-skid layer at the bottom makes contact with a bottom surface of a car, so that the floor mat is stably connected into the car, and a skid problem is prevented. Moreover, multiple layers of the floor mat are equal-thickness structures, and the multi-layer structures are connected by heat sealing processes, so that the floor mat can be formed into a composite mat having equal-thickness layer structures, and the problem of deformation or instability due to uneven thicknesses of the floor mat can be prevented.

It should be understood that the above overall description and later description are just exemplary and explanatory, rather than restricting the present disclosure.

BRIEF DESCRIPTION OF THE DRAWINGS

One or more embodiments are illustrated by figures in the corresponding attached figures, and these illustrative descriptions and attached figures do not constitute limitations on the embodiments. Components with the same reference numerals in the attached figures are shown as similar components. The attached figures do not constitute scale limitations.

Figure 1:
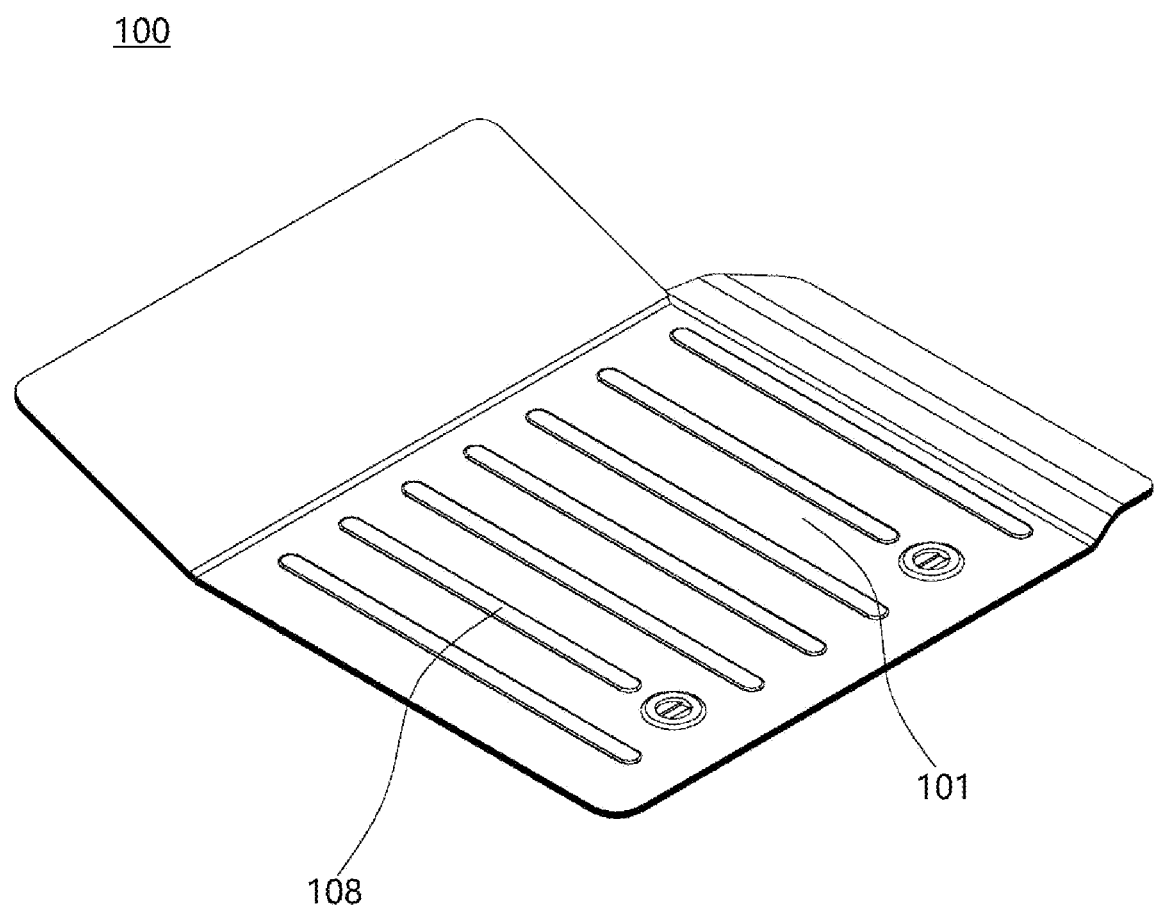
FIG. 1 is a structural schematic diagram of a car floor mat provided by the embodiment of the present disclosure.

Reference signs in the attached figures:
100, floor mat; 101, wear-resistant layer; 102, anti-skid layer; 103, supporting layer; 104, stable layer; 105, connecting layer; 106, mesh fabric; 107, connecting inverted hook; and 108, anti-skid strip.

DETAILED DESCRIPTION OF THE EMBODIMENTS

In order to have a more detailed understanding of the features and technical contents of the embodiment of the present disclosure, the implementation of the embodiment of the present disclosure are described in detail with the attached figures. The attached figures are used for reference only and are not used to limit the embodiment of the present disclosure. In the following technical description, for convenience of explanation, a number of details are used to provide a full understanding of the disclosed embodiments. However, one or more embodiments may still be practiced without these details. In other cases, well-known structures and devices may simplify the presentation in order to simplify the attached figures.

In the specification, claims and attached figures of in the embodiment of the present disclosure, the terms such as "first" and "second" are intended to distinguish between similar objects but do not necessarily indicate a specific order or sequence. It should be understood that the data termed in such a way are interchangeable in proper circumstances, so that the embodiment of the present disclosure described herein can be implemented in other orders than the order illustrated or described herein. In addition, the terms "including", "having", or any other variant thereof, are intended to cover a non-exclusive inclusion.

In the description of the present disclosure, the indicative direction or position relations of the terms such as "upper", "lower", "inner", "middle", "outer", "front" and "rear" are direction or position relations illustrated based on the attached figures. The terms are mainly used for facilitating the description and embodiments of the present disclosure, but not for indicating or hinting that the indicated device or element must be in a specific direction and is constructed and operated in the specific direction. Also, besides direction or position relations, some of the terms above may be used to refer to other meanings, for example, the term "on" may also be used to refer to some kind of dependency or connection relationship in some cases. For any person skilled in the art, the specific meanings of the terms in the present disclosure can be understood according to specific conditions.

Moreover, the terms "arranged", "connected" and "fixed" should be understood broadly. For example, the connection may be fixed connection, detachable connection or integral construction; the connection may be mechanical connection or electrical connection; the connection may be direct connection, or indirect connection through an intermediate, or internal communication between two devices, elements or components. For any person skilled in the art, the specific meanings of the terms in the present disclosure can be understood according to specific conditions.

In the descriptions of the embodiments of the present disclosure, the terms "a plurality of" means at least two, unless otherwise specified.

In the present disclosure, the character "/" generally indicates an "or" relationship between the associated objects. For example, A/B stands for A or B.

The term "and/or" describes an association relationship for describing associated objects and represents that three relationships may exist. For example, A and/or B represent three relationships: A or B, or A and B.

It needs to be illustrated that under the compatible condition, the embodiments in the present disclosure and the features in the embodiments can be combined with each other.

Figure 2:
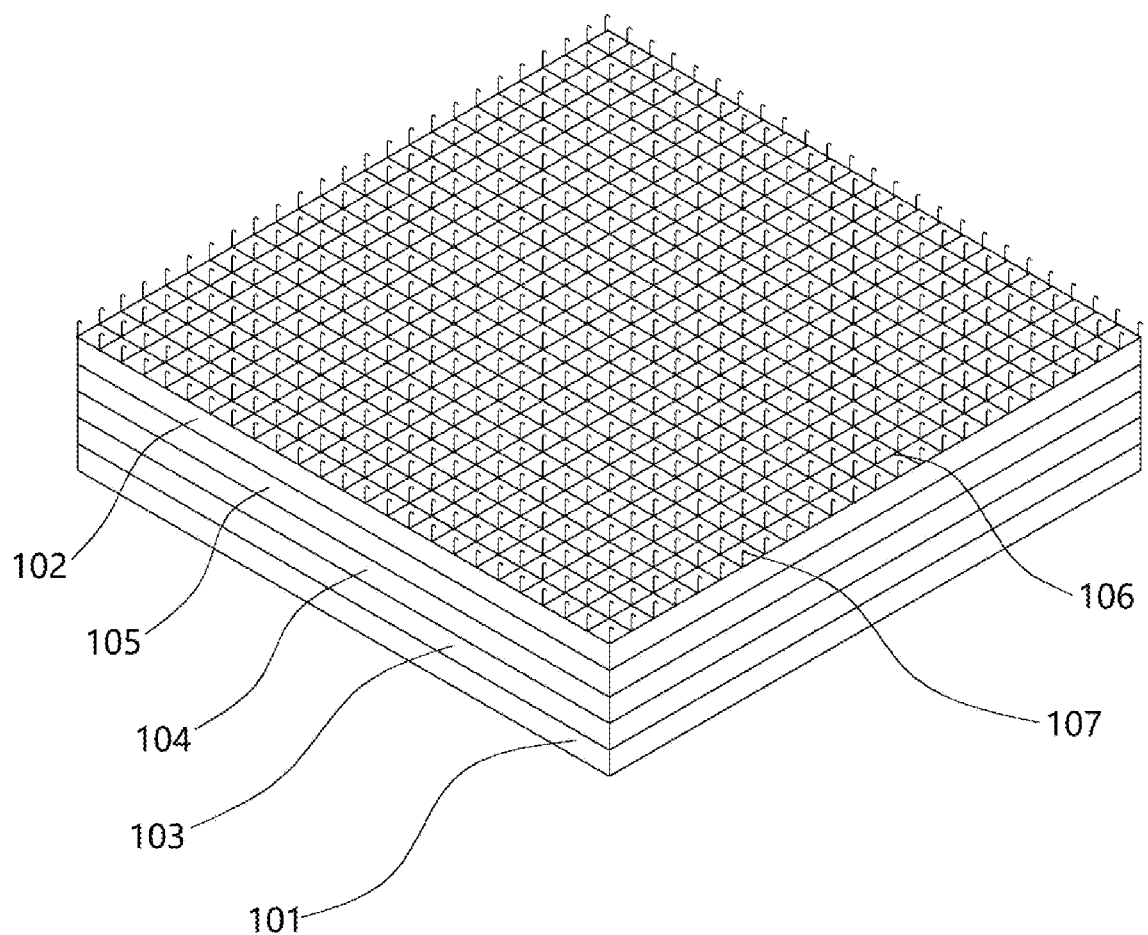
FIG. 2 is a layered structural schematic diagram of a car floor mat provided by the embodiment of the present disclosure.

As shown in FIG. 1 to FIG. 2, the embodiment of the present disclosure provides a car floor mat.

A car floor mat 100 includes:

a wear-resistant layer 101 arranged on an upper surface of the floor mat 100;

an anti-skid layer 102 arranged on a lower surface of the floor mat 100;

a supporting layer 103 and a stable layer 104, wherein the supporting layer 103 and the stable layer 104 are stacked between the wear-resistant layer 101 and the anti-skid layer 102;

the wear-resistant layer 101, the anti-skid layer 102, the supporting layer 103 and the stable layer 104 are all layer structures having equal thickness, and the adjacent layers are connected by a heat sealing process. It should be noted that, the "heat sealing process" described herein refers to a process of heating and pressing the layers to form composite layers, followed by sealing the composite layers to form the composite layers into a required shape.

By adopting the car floor mat provided by the embodiment of the present disclosure, the floor mat is formed by the wear-resistant layer 101, the supporting layer 103, the stable layer 104 and the anti-skid layer 102 that are connected by heat sealing processes. The bending resistance of the floor mat can be increased by the connection between the multi-layer structures, and the structures in different layers can play different roles. The wear resistance of the floor mat can be increased through the wear-resistant layer 101, and the supportability and stability on the floor mat can be increased through the supporting layer 103 and the stable layer 104. Therefore, the problem of deformation of the floor mat can be avoided. The anti-skid layer 102 can be tightly connected with a bottom layer inside a vehicle, so that the floor mat is prevented from skidding when in use. Moreover, each layer of the floor mat is an equal-thickness structure, and the multi-layer structures are connected by heat sealing processes, so that the floor mat can be formed into a composite mat having equal-thickness layer structures, and the floor mat can be shaped into required shapes.

Further, the supporting layer 103 is adjacent to the wear-resistant layer 101, and the stable layer 104 is adjacent to the anti-skid layer 102. In the embodiment, a multi-layer structure of the floor mat 100 sequentially includes a wear-resistant layer 101, a supporting layer 103, a stable layer 104 and an anti-skid layer 102, wherein the supporting layer 103 and the wear-resistant layer 101 are partially made of the same materials and can form a more stable connected structure with each other.

Further, the car floor mat 100 also includes a connecting layer 105. The connecting layer 105 is arranged between the stable layer 104 and the anti-skid layer 102. The connecting layer, the stable layer 104 and the anti-skid layer 102 have equal thickness. The connecting layer 105 is respectively connected with the stable layer 104 and the anti-skid layer 102 by heat sealing processes.

In the embodiment, by providing the connecting layer 105 between the stable layer 104 and the anti-skid layer 102, the connection strength between the stable layer 104 and the anti-skid layer 102 can be increased, which can prevent unstable adhesion and delamination cracking between the stable layer 104 and the anti-skid layer 102.

Specifically, the stable layer 104 includes a chemically crosslinked polyethylene foam material (XPE), the anti-skid layer 102 includes polyethylene terephthalate (PET), and the connecting layer 105 includes polyethylene (PE).

Wherein, the PE material can be stably bonded with XPE and also can be stably bonded with PET, so the adhesion between the stable layer 104 and the anti-skid layer 102 can be increased.

Further, the wear-resistant layer 101 includes a mixture of thermoplastic vulcanizate (TPV) and a thermoplastic elastomer (TPE), and the supporting layer 103 includes TPE. In the embodiment, the wear-resistant layer 101 is made of a mixture of TPV and TPE, so that the wear-resistant and scratch-resistant performances of the floor mat 100 can be enhanced. The supporting layer 103 is made of TPE, so that the softness of the floor mat can be adjusted, a stable supporting role is achieved, and the floor mat is prevented from deforming. The material of the supporting layer 103 is partially the same as that of the wear-resistant layer 101, so that the two layers can be stably bonded together, thereby improving the overall stability of the multi-layer structure.

Further, the wear-resistant layer 101 includes TPV and TPE. The mixture of TPV and TPE is used, and good wear-resistant and scratch-resistant performances can be obtained.

Further, the anti-skid layer 102 includes PET. PET is adopted to provide an anti-skid performance, and the stability of the floor mat is further improved.

Further, the supporting layer 103 includes TPE. TPE is adopted, and the softness of the floor mat can be adjusted to provide a supporting performance. TPE can be stably bonded with the material of the wear-resistant layer 101.

Further, the stable layer 104 includes XPE. XPE is adopted, and mainly plays a role in preventing deformation.

Further, the connecting layer 105 includes PE. PE is adopted and can be combined with the XPE of the stable layer 104 and the PET of the anti-skid layer 102 respectively, so that the adhesion between the layers is increased, and the stability of the floor mat is improved.

Further, the car floor mat 100 also includes a mesh fabric 106 arranged on a lower surface of the anti-skid layer 102.

In the embodiment, the mesh fabric 106 is paved on the lower surface of the anti-skid layer 102, and the mesh fabric 106 is fused on the bottom of the anti-skid layer 102, so that the floor mat can be stably connected to the bottom of the vehicle through the mesh fabric 106.

Further, the mesh fabric 106 is formed by warp and weft weaving, and a lower surface of the mesh fabric 106 is provided with connecting inverted hooks 107.

In the embodiment, the mesh fabric 106 is woven, and the mesh fabric 106 is woven in warp and weft, so that the mesh fabric 106 can also play a role in stabilizing the floor mat, sheets of the floor mat can be prevented from stretching, and the floor mat can be well shaped and stabilized. The connecting inverted hooks 107 arranged on the mesh fabric 106 can be connected with a felt at the bottom of the vehicle, so that the floor mat can be fixed on the felt.

Further, an upper surface of the wear-resistant layer 101 is provided with anti-skid strips 108.

In the embodiment, the anti-skid strips 108 on the upper surface of the wear-resistant layer 101 can increase the friction force of the floor mat, so that the foot of a passenger can be prevented from skidding on the floor mat.

The following description fully shows specific embodiments of the present disclosure, so that those skilled in the art can practice and reproduce the specific embodiments. Other embodiments may include structural and other changes. Embodiments only represent possible variations. Unless explicitly required, individual parts and functions are optional, and the order of operation can be changed. Portions and features of some embodiments may be included in or in place of portions and features of other embodiments. The embodiment of the present disclosure is not limited to the structures that are described in the foregoing and that are shown in the attached figures, and modifications and changes may be made without departing from the scope of the present disclosure. The scope of the present disclosure is limited only by the appended claims.

What is claimed is:

1. A car floor mat (100), comprising:
a wear-resistant layer (101) arranged on an upper surface of the car floor mat (100);
an anti-skid layer (102) arranged on a lower surface of the car floor mat (100); [and] a supporting layer (103) and a stable layer (104) stacked between the wear-resistant layer (101) and the anti-skid layer (102); and
a connecting layer (105) arranged between the stable layer (104) and the anti-skid layer (102); wherein the connecting layer (105) is respectively connected with the stable layer (104) and the anti-skid layer (102) by heat sealing processes;
wherein the wear-resistant layer (101), the anti-skid layer (102), the supporting layer (103), the stable layer (104), and the connecting layer (105) are all layer structures having equal thickness, and the adjacent layers are connected by a heat sealing process.

2. The car floor mat (100) according to claim 1, wherein the supporting layer (103) is adjacent to the wear-resistant layer (101), and the stable layer (104) is adjacent to the anti-skid layer (102).

3. The car floor mat (100) according to claim 1, wherein the stable layer (104) comprises a chemically crosslinked polyethylene foam material (XPE), the anti-skid layer (102) comprises polyethylene terephthalate (PET), and the connecting layer (105) comprises polyethylene (PE).

4. The car floor mat (100) according to claim 3, wherein the wear-resistant layer (101) comprises a mixture of thermoplastic vulcanizate (TPV) and a thermoplastic elastomer (TPE), and the supporting layer (103) comprises TPE.

5. The car floor mat (100) according to claim 1, wherein the wear-resistant layer (101) comprises TPV and TPE; and/or, the anti-skid layer (102) comprises PET; and/or, the supporting layer (103) comprises TPE; and/or, the stable layer (104) comprises XPE.

6. The car floor mat (100) according to claim 1, further comprising mesh fabric (106) arranged on a lower surface of the anti-skid layer (102).

7. The car floor mat (100) according to claim 1, wherein an upper surface of the wear-resistant layer (101) is provided with anti-skid strips (108).

* * * * *